(12) United States Patent
Miyazaki

(10) Patent No.: US 11,279,176 B2
(45) Date of Patent: Mar. 22, 2022

(54) PNEUMATIC TIRE

(71) Applicant: Toyo Tire Corporation, Itami (JP)

(72) Inventor: Tetsuji Miyazaki, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 79 days.

(21) Appl. No.: 16/424,809

(22) Filed: May 29, 2019

(65) Prior Publication Data

US 2019/0375243 A1 Dec. 12, 2019

(30) Foreign Application Priority Data

Jun. 6, 2018 (JP) .............................. JP2018-108537

(51) Int. Cl.
*B60C 11/12* (2006.01)
*B60C 11/03* (2006.01)

(52) U.S. Cl.
CPC ...... *B60C 11/0304* (2013.01); *B60C 11/1204* (2013.01); *B60C 11/1236* (2013.01); *B60C 11/1263* (2013.01); *B60C 2011/0348* (2013.01)

(58) Field of Classification Search
CPC ......... B60C 11/12; B60C 11/03; B60C 11/01; B60C 11/1281; B60C 11/0304; B60C 11/1204; B60C 2011/0341; B60C 2011/0337; B60C 2011/0386; B60C 2011/0393

See application file for complete search history.

(56) References Cited

U.S. PATENT DOCUMENTS

2014/0238566 A1 8/2014 Takahashi
2015/0210121 A1 7/2015 Sanae
(Continued)

FOREIGN PATENT DOCUMENTS

JP 11-334321 A 12/1999
JP 2011-245903 A 12/2011
JP 2014-162295 A 9/2014
(Continued)

OTHER PUBLICATIONS

Office Action dated Apr. 20, 2021, issued in counterpart CN Application No. 201910429923.1, with English Translation. (16 pages).
(Continued)

*Primary Examiner* — Cedrick S Williams
(74) *Attorney, Agent, or Firm* — Westerman, Hattori, Daniels & Adrian, LLP

(57) ABSTRACT

The curved sipe in the present invention is connected at one or both sipe end portions to a circumferential recess extending in the tire circumferential direction, an angle of the curved sipe with respect to the circumferential recess is less than 90 degrees in a curve outside direction, the curved sipe has a chamfered inclined surface portion provided in the curve outside direction of the curved sipe, the inclined surface portion is provided in a region surrounded by an inclination start line that becomes a ridge line between a surface or offset surface of the rib and the inclined surface portion, the curved sipe and the circumferential recess, gradually increases a depth from the inclination start line toward the curved sipe, and forms a straight line in sectional view by a plane perpendicular to the inclination start line.

6 Claims, 4 Drawing Sheets

(56) References Cited

U.S. PATENT DOCUMENTS

2017/0015143 A1   1/2017  Nagase
2018/0086148 A1   3/2018  Kujime et al.

FOREIGN PATENT DOCUMENTS

| JP | 2015047977 A | * | 3/2015 |
| JP | 2015-140047 A | | 8/2015 |
| JP | 2017-024454 A | | 2/2017 |
| JP | 2018-052150 A | | 4/2018 |
| WO | 2016/055173 A1 | | 4/2016 |
| WO | 2016/128085 A1 | | 8/2016 |
| WO | 2017/122433 A1 | | 7/2017 |

OTHER PUBLICATIONS

Office Action dated Feb. 8, 2022, issued in counterpart JP Application No. 2018-108537, with English Translation. (9 pages).

* cited by examiner

PNEUMATIC TIRE

BACKGROUND OF THE INVENTION

Field of the Invention

The present invention relates to a pneumatic tire including a tread portion.

Description of the Related Art

Heretofore, in a pneumatic tire, there is one in which a large number of cuts called sipes are formed on a rib defined by main grooves extending in a tire circumferential direction. The large number of sipes are formed on the rib, whereby an edge effect and a dehydration effect are improved, and running performance on an icy and snowy road surface, a wet road surface and the like can be improved. For example, Patent Documents 1 to 3 mentioned below describe pneumatic tires, each including a rib on which a plurality of sipes are arranged in a tire circumferential direction at regular intervals.

However, when the plurality of sipes are arranged on the rib at intervals in the tire circumferential direction, there is a problem that rigidity in vicinities of the sipes decreases, an amount of wear in the vicinities of the sipes is increased, and as a result, so-called inter-sipe heel-and-toe wear occurs. Moreover, when the plurality of sipes are arranged at intervals in the tire circumferential direction, there is a problem that regions sandwiched by main grooves and the sipes form pseudo blocks (hereinafter, referred to as "pseudo blocks"), and there is a problem that a pattern noise caused by a hitting sound when the pseudo blocks are grounded is generated.

PRIOR ART DOCUMENTS

Patent Documents

Patent Document 1: JP-A-11-334321
Patent Document 2: WO2016/055173A1
Patent Document 3: WO2016/128085A1

SUMMARY OF THE INVENTION

The present invention has been invented in consideration of such a problem as mentioned above. It is an object of the present invention to provide a pneumatic tire in which the inter-sipe heel-and-toe wear is reduced and the noise performance is improved.

In the present invention, the following pneumatic tire has been invented in order to achieve the above-described object.

That is, a pneumatic tire comprising a tread portion,
wherein the tread portion includes a plurality of main grooves extending in a tire circumferential direction and a plurality of land portions defined by the main grooves,
at least one of the pluralities of land portions is formed of a rib on which a plurality of sipes are provided at intervals in the tire circumferential direction,
the plurality of sipes include a curved sipe having a curved surface shape,
the curved sipe is connected at one or both sipe end portions to a circumferential recess extending in the tire circumferential direction,
an angle of the curved sipe with respect to the circumferential recess is less than 90 degrees in a curve outside direction,
the curved sipe has a chamfered inclined surface portion provided in the curve outside direction of the curved sipe,
the inclined surface portion is provided in a region surrounded by an inclination start line that becomes a ridge line between a surface or offset surface of the rib and the inclined surface portion, the curved sipe and the circumferential recess, gradually increases a depth from the inclination start line toward the curved sipe, and forms a straight line in sectional view by a plane perpendicular to the inclination start line.

In accordance with such a configuration, the following effects are obtained.

In the curved sipe that has the curved surface shape and is connected with an angle of less than 90 degrees, that is, an acute angle as the angle of the curved sipe with respect to the circumferential recess in the curve outside direction, a pseudo block corner portion sandwiched between the circumferential recess and the curved sipe also has an acute angle. When the pseudo block corner portion has an acute angle, rigidity of the corner portion decreases, and the inter-sipe heel-and-toe wear becomes apt to occur. However, in the above-described configuration, the chamfered inclined surface portion is provided in the region surrounded by the inclination start line, the curved sipe and the circumferential recess in the curve outside direction of the curved sipe. Accordingly, a ground contact pressure of the pseudo block corner portion against the road surface decreases, and the ground contact pressure on the rib is made uniform. In this way, rib rigidity is made uniform, whereby the inter-sipe heel-and-toe wear caused by the above-described corner portion can be reduced. Moreover, when the ground contact pressure on the rib is made uniform, the hitting sound when the pseudo blocks are grounded decreases, and accordingly, the noise performance is improved.

A plurality of the curved sipes are formed at a position where at least a part of one of the curved sipes overlaps at least a part of other of the curved sipes in a tire width direction. Generally, when the plurality of sipes are formed at the position where at least a part of the one-side sipe overlaps at least a part of the other-side sipe in the tire width direction, a large number of the sipes are included in a ground contact surface. This increases the problem that the rib rigidity decreases though an edge effect and the like of the sipes are strengthened. However, in accordance with the above-described configuration, the curved sipe has the chamfered inclined surface portion, and accordingly, the edge effect and the like of the sipes can be strengthened while avoiding the problem that the rib rigidity decreases.

The plurality of curved sipes formed at the position where at least a part of one of the curved sipes overlaps at least a part of the other of the curved sipes in the tire width direction includes first and second curved sipes facing each other while sandwiching a circumferential recess extending in the tire circumferential direction,
the first curved sipe is adjacent at a one-side sipe end portion to the inclined surface portion, and is not adjacent at other-side sipe end portion to the inclined surface portion, and
the inclined surface portion owned by the second curved sipe is disposed on a virtual extension line of the other-side sipe end portion. When the rib is grounded on the road surface, a stress is concentrated on the end portion region that is not adjacent to the inclined surface portion of the curved sipe. However, the inclined surface portion of the other-side curved sipe is disposed on the virtual extension line of the end portion concerned, whereby such stress concentration that occurs in the end portion region can be relieved.

The rib has a circumferential sipe, and the plurality of curved sipes formed at the position where at least a part of one of the curved sipes overlaps at least a part of the other of the curved sipes in the tire width direction includes the curved sipe connected to the main groove as the circumferential recess, and the curved sipe connected to the circumferential sipe as the circumferential recess, the curved sipe being as other than the curved sipe connected to the main groove. The inclined surface portion is provided on each of the plurality of thin ribs formed while sandwiching the circumferential sipe therebetween, whereby the edge effect and the like of the sipe can be strengthened while making the rib rigidity uniform.

The plurality of sipes provided at intervals in the tire circumferential direction include a short sipe, a length in a tire width direction of the short sipe is shorter than a length in a tire width direction of the curved side, and the short sipe is formed to overlap at least a part of the curved sipe in the tire circumferential direction, and is connected at a one-side sipe end portion to the main groove or the circumferential sipe. By including the short sipes, the rigidity of the ribs is appropriately decreased to reduce the hitting sound when the pseudo blocks are grounded, and the noise performance can be improved.

The rib includes a plurality of thin ribs defined by the main groove and a circumferential sipe extending in the tire circumferential direction, and a length in a tire width direction of the inclined surface portion of each of the curved sipes is 40% or more of a length in a tire width direction of each of the thin ribs provided with the curved sipes. In accordance with such a configuration, it becomes possible to effectively suppress the decrease of the rib rigidity.

DETAILED DESCRIPTION OF THE PREFERRED EMBODIMENTS

Figure 1:
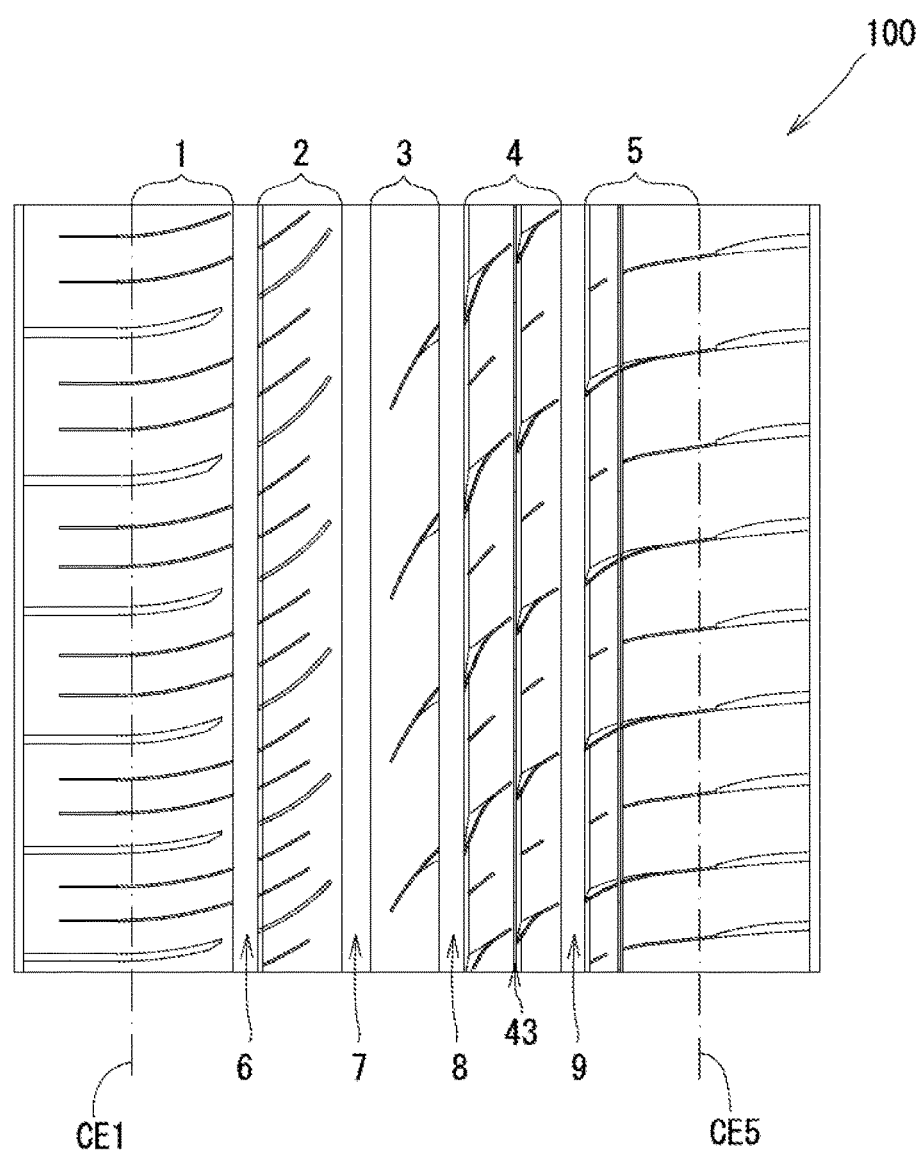
FIG. 1 is a development view illustrating an example of a tread portion of a pneumatic tire according to the present invention.

Hereinafter, an embodiment in a pneumatic tire according to the present invention will be described with reference to the drawings. Note that, in the respective drawings, dimensional ratios in the drawings and actual dimensional ratios do not necessarily coincide with each other, and moreover, dimensional ratios between the respective drawings do not necessarily coincide with one another.

FIG. 1 is a plan view illustrating an embodiment of a tread portion 100 of the pneumatic tire according to the present invention. The tread portion 100 includes: four main grooves 6 to 9 extending in the tire circumferential direction; and five land portions 1 to 5 defined by the main grooves 6 to 9. The five land portions 1 to 5 are composed of a shoulder land portion 1, a quarter land portion 2, a center land portion 3, a quarter land portion 4 and a shoulder land portion 5. The shoulder land portions 1 and 5 are located on outermost sides of the tread portion 100 in a tire width direction, and are sandwiched by ground contact ends CE1 and CE5 and the main grooves 6 and 9. The quarter land portions 2 and 4 are adjacent to center sides of the shoulder land portions while sandwiching the main grooves 6 and 9 therebetween. The center land portion 3 is adjacent to center sides of the quarter land portions 2 and 4 while sandwiching the main grooves 7 and 8 therebetween. The respective land portions 1 to 5 are composed of ribs continuously extending in the tire circumferential direction, and on each of the ribs, a plurality of sipes are formed at intervals in the tire circumferential direction. The rib of the shoulder land portion 1 refers to a region between the main groove 6 and the ground contact end CE1, and the rib of the shoulder land portion 5 refers to a region between the main groove 9 and the ground contact end CE5. It is not necessary that a direction where the main grooves extend be completely coincide with the tire circumferential direction. It is preferable that the number of main grooves be three or more, and that the number of land portions be four or more. In the case where the number of land portions is four, the center land portion is not provided.

The ground contact ends CE1 and CE5 are outermost positions of the tread portion 100 in the tire width direction when the tire assembled to a normal rim and applied with a normal internal pressure and a normal load is grounded to a flat road surface. The normal rim is a rim determined for each of tires by a standard on which the tires are based, the standard being included in a system of standards. For example, the normal rim is a reference rim defined by Japan Automobile Tyre Manufacturers Association (JATMA), "Design Rim" defined by The Tire and Rim Association, Inc. (TRA), or "Measuring Rim" defined by The European Tyre and Rim Technical Organization (ETRTO). The normal internal pressure is an air pressure defined for each of the tires by the standard on which the tires are based, the standard being included in the system of standards. For example, the normal internal pressure is a maximum air pressure defined by JATMA, a maximum value described in the table "TIRE LOAD LIMITS AT VARIOUS COLD INFLATION PRESSURES" in TRA, or "INFLATION PRESSURE" defined by ETRTO. The normal load is a load determined for each of the tires by the standard on which the tires are based, the standard being included in the system of standards. For example, the normal load is a maximum load capacity defined by JATMA, a maximum value described in the above table of TRA, or "LOAD CAPACITY" defined by ETRTO.

Figure 2:
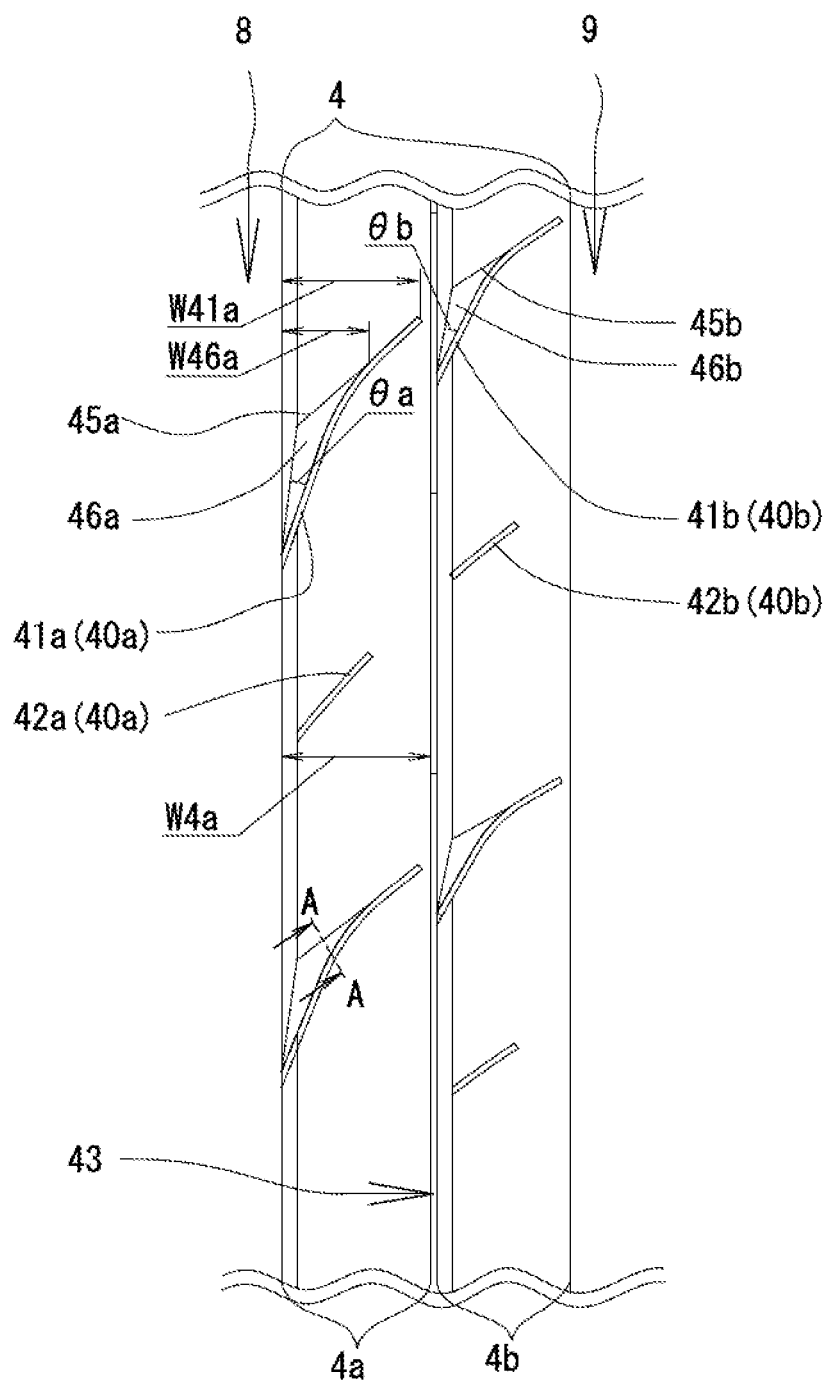
FIG. 2 is an enlarged view of a quarter land portion and a peripheral region thereof.

FIG. 2 is an enlarged view of the quarter land portion 4 in FIG. 1 and a peripheral region thereof.

On the rib that constitutes the quarter land portion 4, a plurality of sipes 40a are provided at intervals in the tire circumferential direction. The plurality of sipes 40a include curved sipes 41a in which a surface shape is curved. The curved sipes 41a are connected to the main groove 8 as a circumferential recess extending in the tire circumferential direction at one-side sipe end portions thereof. An angle θa of each of the curved sipes 41a with respect to the main groove 8 is less than 90 degrees, that is, forms an acute angle in a curve outside direction (a direction where the curve of the sipe protrudes). Then, the curved sipe 41a has a chamfered inclined surface portion 46a in the curve outside direction. The inclined surface portion 46a is surrounded by: an inclination start line 45a formed on a rib surface or an offset surface to be described later in the curve outside direction of the curved sipe 41a; the curved sipe 41a; and the main groove 8. The chamfered inclined surface portion is not provided in a curve inside direction (a direction where the curve of the sipe is recessed).

The chamfered inclined surface portion 46a is formed, whereby a ground contact pressure of a corner portion against the road surface decreases, the corner portion forming an acute angle between the main groove 8 and the curved sipe 41a, and the ground contact pressure against the rib is made uniform. In this way, rib rigidity is made uniform, whereby inter-sipe heel-and-toe wear caused by the pseudo block corner portion can be reduced. Moreover, when the ground contact pressure on the rib is made uniform, the hitting sound when the pseudo blocks are grounded decreases, and accordingly, the noise performance is improved. Furthermore, when the inclined surface portion 46a is formed in the curved sipe 41a, a recess volume that enables capture of water on the road surface is increased, and a dehydration effect of the sipe can be improved. Moreover, each of the curved sipe 41a and the inclined surface portion 46a has a connection portion to the main groove 8, and accordingly, the water on the road surface is easy to flow between the curved sipe 41a and the inclined surface portion 46a and the main groove 8, and the dehydration effect can be further improved.

Figure 3:
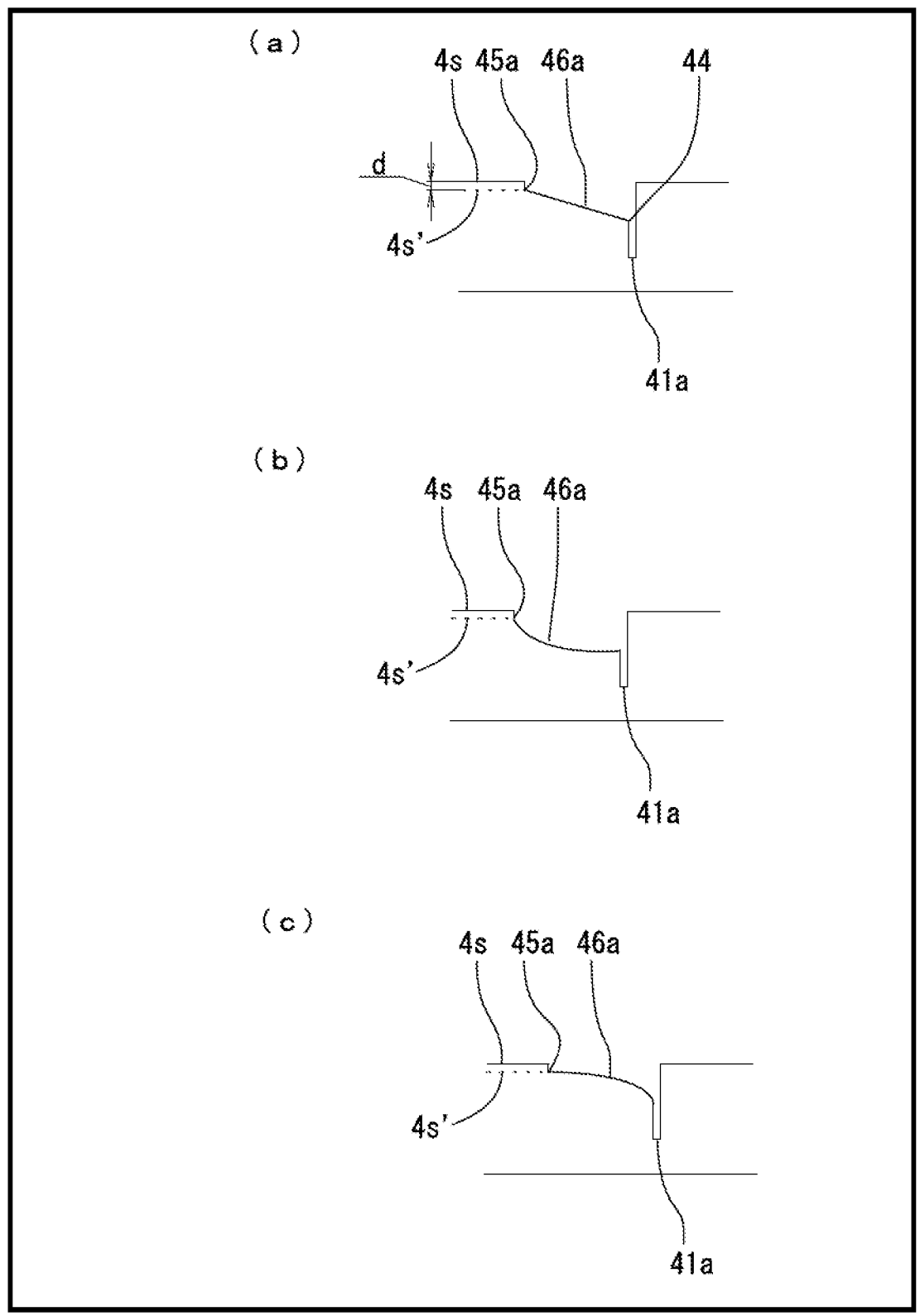
FIG. 3 is an actual cross-sectional view of an A-A cross section and a comparative cross-sectional views therewith in FIG. 2.

FIG. 3(*a*) is an actual cross-sectional view along a line A-A in FIG. 2, illustrating a sectional view by a plane perpendicular to the inclination start line 45a of FIG. 2. As illustrated in FIG. 3(*a*), the inclination start line 45a is a ridge line between the inclined surface portion 46a and a virtual offset surface 4s' shifted from a surface 4s of the rib by an offset amount d in a depth direction. The offset amount d just needs to be 0 to 0.6 mm. When the offset amount d is 0 mm, the inclination start line 45a becomes a ridge line between the surface 4s of the rib and the inclined surface portion 46a. Then, the chamfered inclined surface portion 46a gradually increases a depth thereof from the inclination start line 45a toward the curved sipe 41a, and forms a straight line in the sectional view by such a cross section A-A.

An effect brought by the fact that the chamfered inclined surface portion 46a forms a straight line in the sectional view by the cross section A-A will be described also with reference to FIG. 3(*b*) and FIG. 3(*c*) which are comparative cross-sectional views. When the inclined surface portion 46a forms a recessed curve in the sectional view as in FIG. 3(*b*), an angle made between the rib surface 4s or the offset surface 4s' and the inclined surface portion becomes small, and a large edge is formed from the surface of the rib across the inclined surface portion 46a. This large edge is apt to be worn much due to a stress concentration. In contrast, in FIG. 3(*a*), though an edge is formed between the rib surface 4s and the inclination start line 45a, the offset amount d of the edge is small, and an amount of wear therein is smaller than in FIG. 3(*b*). As in FIG. 3(*c*), when the inclined surface portion 46a forms a protruded curve in the sectional view, a ground contact pressure of the inclined surface portion 46a does not decrease sufficiently, and accordingly, the noise cannot be reduced sufficiently. Moreover, the amount of water captured to the inclined surface portion 46a is small, and the dehydration effect is small. In contrast, in FIG. 3(*a*), a decreased amount of the ground contact pressure against the inclined surface portion 46a is larger than in FIG. 3(*c*), and accordingly, it is easy to uniform the ground contact pressure, and there is an advantage that the amount of water captured to the inclined surface portion 46a is large and the dehydration effect is large. Moreover, when a metal die is processed and formed so that the inclined surface portion forms a curved line as in FIGS. 3(*b*) and 3(*c*), a process becomes complicated, and meanwhile, in FIG. 3(*a*), there is also an advantage that it is easy to process and form the metal die. Especially, as seen in FIG. 3(*a*), when a portion from the inclination start line 45a to a line of intersection 44 of the inclined surface portion and the curved sipe is formed along a straight line, this is preferable since the above-described effect can be obtained effectively.

The description returns to FIG. 2. The quarter land portion 4 includes a circumferential sipe 43 that is a circumferential recess extending in the tire circumferential direction. Therefore, on the quarter land portion 4, there are formed: a thin rib 4a between the main groove 3 and the circumferential sipe 43; and a thin rib 4b between the circumferential sipe 43 and the main groove 9. Each of the thin ribs 4a and 4b is thinner than the quarter land portion 4. Curved sipes 41b formed on the thin rib 4b are connected to the circumferential sipe 43 as a circumferential recess extending in the tire circumferential direction at one-side sipe end portions thereof. Like each of the curved sipes 41a of the thin rib 4a, also in each of the curved sipes 41b, an angle θb of this curved sipe 41b with respect to the circumferential sipe 43 is less than 90 degrees, that is, forms an acute angle in the curve outside direction. Then, the curved sipe 41b has a chamfered inclined surface portion 46b. The inclined surface portion 46b is surrounded by: an inclination start line 45b formed in a curve outside direction of the curved sipe 41b; the curved sipe 41b; and the circumferential sipe 43. The inclination start line 45b becomes a ridge line between a surface or offset surface of the rib and the inclined surface portion 46b. Then, it is preferable that the inclined surface portion 46b gradually increase a depth thereof from the inclination start line 45b toward the curved sipe 41b, and form a straight line in the sectional view by such a plane perpendicular to the inclination start line 45a. An effect of this is similar to that of the inclined surface portion 46a of the curved sipe 41a formed on the thin rib 4a.

Figure 4:
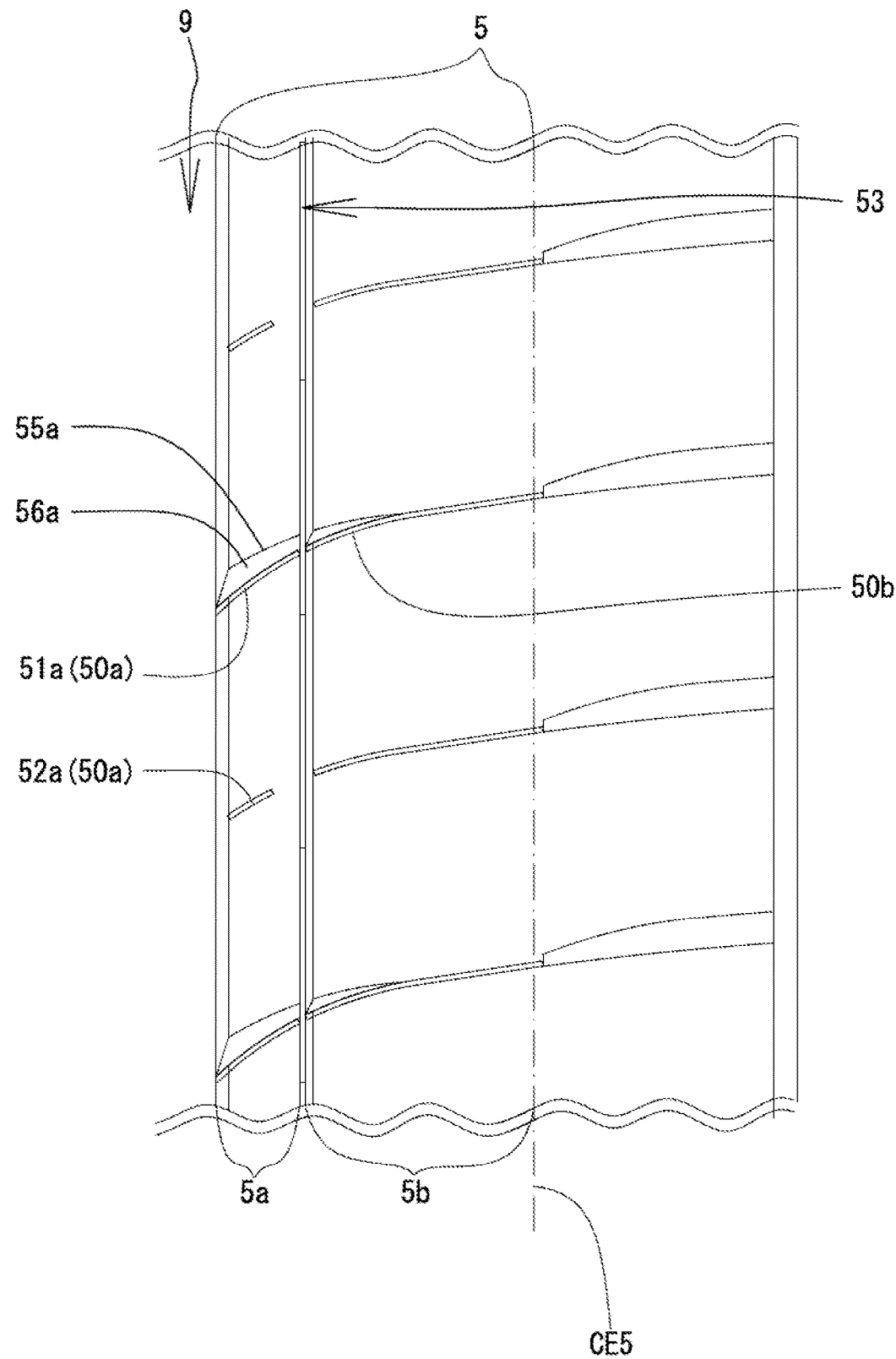
FIG. 4 is an enlarged view of a shoulder land portion and a peripheral region thereof.

FIG. 4 is an enlarged view of the shoulder land portion 5 in FIG. 1 and a peripheral region thereof. The shoulder land portion 5 includes a circumferential sipe 53 that is a circumferential recess extending in the tire circumferential direction. Therefore, on the shoulder land portion 5, there are formed: a thin rib 5a between the main groove 9 and the circumferential sipe 53; and a thin rib 5b between the circumferential sipe 43 and the ground contact end CE5. On the thin ribs 5a and 5b, pluralities of sipes 50a and 50b are formed respectively at intervals in the tire circumferential direction. The plurality of sipes 50a include: curved sipes 51a in which one-side sipe end portions are connected to the main groove 9 and other-side sipe end portions are connected to the circumferential sipe 53; and short sipes 52a in which one-side sipe end portions are connected to the main groove 9 but other-side sipe end portions are closed without being connected to the circumferential sipe 53. The plurality of sipes 50b have sipe end portions connected to the circumferential sipe 53 and sipe end portions connected to lateral grooves.

Like the curved sipes 41a and 41b, the curved sipes 51a on the thin rib 5a also have chamfered inclined surface portions 56a in a curve outside direction of the curved sipes 51a, and accordingly, an effect thereof is similar to that of the chamfered inclined surface portions 46a on the above-mentioned curved sipes 41a. However, there is such a structural difference that, while the curved sipes 41a and 41b are connected at the one-side sipe end portions to the circumferential recess and one-side ends of the inclination start lines are located on the curved sipes 41a and 41b, the curved sipes 51*a* are connected at the both-side sipe end portions to the circumferential recesses and the inclination start lines do not contact with the curved sipes 51*a*. Then, due to this difference, the dehydration effect of the sipes is further improved following the increase of the recess volume, and in addition, it is facilitated for air in the sipes to escape to the circumferential recesses, whereby an effect of making it possible to suppress the occurrence of the pumping sound is obtained.

Inclination angles of the chamfered inclined surface portions just need to be set arbitrarily. At this time, the inclination angles of ail the inclined surface portions may be unified, or the inclination angles of the inclined surface portion may be unified for each of the thin ribs, or the inclination angles may be set for each of the inclined surface portions. Moreover, a depth of the line of intersection 44 of each inclined surface portion and each curved sipe from the surface of the rib (hereinafter, this depth will be referred to as "intersection line depth") is arbitrary. When the depth of the sipe is set to 100%, the intersection line depth just needs to be set to more than 0% and 100% or less. At this time, such intersection line depths of all the inclined surface portions may be unified, or the intersection line depths may be unified for each of the thin ribs, or the intersection line depths may be set for each of the inclined surface portions.

In FIG. 2, the curved sipe 41*a* formed on the thin rib 4*a* and the curved sipe 41*b* formed on the thin rib 4*b* are located at a position where at least a part of the curved sipe 41*a* and at least a part of the curved sipe 41*b* overlap each other in the tire width direction. In this embodiment, the curved sipe 41*b* has the chamfered inclined surface portion 46*b*, and accordingly, an effect brought by providing the sipes, such as an edge effect, can be strengthened while suppressing a problem that is a decrease of the rib rigidity.

Moreover, the curved sipes 41*a* and 41*b* formed at the position where at least a part of each thereof overlaps at least a part of the other in the tire width direction are located at positions facing each other while sandwiching the circumferential sipe 43 therebetween. Then, the curved sipe 41*a* is adjacent to the inclined surface portion 46*a* at the one-side sipe end portion, and is not adjacent to the inclined surface portion 46*a* at the other-side sipe end portion, and the inclined surface portion 46*b* of the sipe 41*b* is disposed on the virtual extension line of the other-side sipe end portion that is not adjacent to the inclined surface portion 46*a*. The virtual extension line of the sipe can be determined by taking the width center of the sipe as a reference. In this way, the inclined surface portion 46*b* of the sipe 41*b* can relieve stress concentration caused in the end portion region of the sipe 41*a*, which is not adjacent to the inclined surface portion 46*a*. Moreover, a pair of the curved sipes which face each other while sandwiching the circumferential recess therebetween form an exterior appearance having continuity, and accordingly, an excellent design is also achieved.

The matter that the sipes are arranged at the position where at least a part of each thereof overlaps at least a part of the other in the tire width direction and the matter that the inclined surface portion of the other-side sipe of the plurality of formed sipes is disposed on the virtual extension line of the end portion of the one-side sipe, the end portion not being adjacent to the inclined surface portion of the one-side sipe, are not only applied to both of the sipes located at the positions facing each other while sandwiching the circumferential sipe therebetween and provided on the different thin ribs but also applied to both of sipes located at positions facing each other while sandwiching the main groove therebetween and provided on different land portions. As seen from FIG. 1, FIG. 2 and FIG. 4, in this embodiment, the curved sipe 41*b* on the quarter land portion 4 and the curved sipe 51*a* on the shoulder land portion 5 are located at positions facing each other while sandwiching the main groove 9 therebetween. The curved sipe 41*b* is adjacent to the inclined surface portion 46*a* at the one-side sipe end portion, and is not adjacent to the inclined surface portion 46*b* at the other-side sipe end portion, and the inclined surface portion 56*a* of the sipe 51*a* is disposed on a virtual extension line of the other-sipe end portion that is not adjacent to the inclined surface portion 46*b*. As a result, the three curved sipes 41*a*, 41*b* and 51*a* mutually relieve stress concentrations occurring in the end portion regions of the adjacent sipes, and in addition, form an exterior appearance that is excellent in design and has continuity among these three.

It is preferable that a length W46*a* in the tire width direction of the inclined surface portion 46*a* of the curved sipe 41*a* be 40% or more of a length W4*a* in the tire width direction of the thin rib 4*a* on which the curved sipe 41*a* is provided. The same as above also applies to the curved sipe 41*b*. In this way, the decrease of the rib rigidity can be suppressed effectively. Moreover, the rigidity of the rib is affected not only by a size of the chamfered inclined surface portion but also by a length in the tire width direction of the sipe. Accordingly, the length W46*a* in the tire width direction of the chamfered inclined surface portion of the curved sipe 41*a* may be set by taking a length W41*a* in the tire width direction of the sipe as a reference. For example, it is recommended that the length W46*a* in the tire width direction of the inclined surface portion 46*a* of the curved sipe 41*a* be set to 35 to 65% of the length W41*a* in the tire width direction of the curved sipe 41*a*, and this setting also applies to the inclined surface portion 46*b* of the curved sipe 41*b*.

Returning to FIG. 2, the plurality of sipes 40*a* and 40*b* formed at intervals in the tire circumferential direction on the thin ribs 4*a* and 4*b* each include two types of sipes different in shape. One type is the above-mentioned curved sipes 41*a* and 41*b* having the curved surface shapes, and the other type is short sipes 42*a* and 42*b*. Lengths in the tire width direction of the short sipes 42*a* and 42*b* are shorter than the lengths in the tire width direction of the curved sipes 41*a* and 41*b*. The curved sipes 41*a* and 41*b* and the short sipes 42*a* and 42*b* are individually provided on the ribs at intervals in the tire circumferential direction. The sipes refer to those in which a cutting width is 2 mm or less, preferably 1.6 mm or less. The short sipes 42*a* and 42*b* may be either straight or curved. By arranging the short sipes 42*a* and 42*b*, the rigidity of the ribs is appropriately decreased to reduce the hitting sound when the pseudo blocks are grounded, and the noise performance can be improved. At the one-side sipe end portions, the short sipes 42*a* and 42*b* are connected to the main groove 8 and the circumferential sipe 43, respectively. In this way, the dehydration effect is improved, and in addition, it is facilitated to cause air in the sipes to escape to the main groove 8 or the circumferential sipe 43, whereby the occurrence of the pumping sound can be suppressed.

The above embodiment is described mainly by taking as an example the arrangement of the sipes and the chamfered inclined surface portions on the quarter land portion 4 and the shoulder land portion 5. However, the arrangement of the sipes and the inclined surface portions on the quarter land portion 4 may be applied to the shoulder land portion 1, the quarter land portion 2, the center land portion 3 and the shoulder land portion 5, and the arrangement of the sipes and the inclined surface portions on the shoulder land portion 5 may be applied to the shoulder land portion 1, the quarter land portion 2, the center land portion 3 and the quarter land portion 4.

The pneumatic tire according to the present invention can be composed similarly to usual pneumatic tires except that the tread portion is composed as described above, and any of a material, a shape, a structure and a manufacturing method, which are conventionally known, can be adopted. Though not illustrated, the pneumatic tire of this embodiment includes: a pair of bead portions; sidewall portions, each of which extends outside in the tire diameter direction from each of the bead portions; and a tread portion continuous with outside ends in the tire diameter direction of the respective sidewall portions.

The present invention is not limited to the above-mentioned embodiments, and is improvable and modifiable in various ways within the scope without departing from the spirit of the present invention.

What is claimed is:

1. A pneumatic tire comprising a tread portion,
   wherein the tread portion includes a plurality of main grooves extending in a tire circumferential direction and a plurality of land portions defined by the main grooves,
   at least one of the pluralities of land portions is formed of a rib on which a plurality of sipes are provided at intervals in the tire circumferential direction,
   the plurality of sipes include a plurality of curved sipes having curved surface shapes,
   each of the curved sipes is connected at one or both sipe end portions to a circumferential recess extending in the tire circumferential direction and is formed at a position where at least a part of at least one of the curved sipes overlaps at least a part of at least one of the other curved sipes in a tire width direction,
   an angle of at least one of the curved sipes with respect to the circumferential recess is less than 90 degrees in a curve outside direction,
   the at least one of the curved sipes has a chamfered inclined surface portion provided in the curve outside direction of the at least one of the curved sipes,
   the chamfered inclined surface portion is provided in a region surrounded by an inclination start line that becomes a ridge line between a surface or offset surface of the rib and the chamfered inclined surface portion, the at least one of the curved sipes and the circumferential recess, gradually increases a depth from the inclination start line toward the at least one of the curved sipes, and forms a straight line in sectional view by a plane perpendicular to the inclination start line,
   the rib has a circumferential sipe, and
   the plurality of curved sipes formed at the position where at least the part of the at least one of the curved sipes overlaps at least the part of the at least one of the other curved sipes in the tire width direction comprise at least one of the curved sipes connected to the main groove as the circumferential recess, and at least one of the curved sipes connected to the circumferential sipe as the circumferential recess, which is at least one of the curved sipes other than the at least one of the curved sipes connected to the main groove.

2. The pneumatic tire according to claim 1, wherein
   the plurality of curved sipes formed at the position where at least the part of the at least one of the curved sipes overlaps at least the part of the at least one of the other curved sipes in the tire width direction include first and second curved sipes facing each other while sandwiching a circumferential recess extending in the tire circumferential direction,
   the first curved sipe is adjacent at a one-side sipe end portion to the chamfered inclined surface portion, and is not adjacent at other-side sipe end portion to the chamfered inclined surface portion, and
   the chamfered inclined surface portion owned by the second curved sipe is disposed on a virtual extension line of the other-side sipe end portion.

3. The pneumatic tire according to claim 1, wherein
   first and second curved sipes facing each other while sandwiching the circumferential recess therebetween are provided, and
   the first curved sipe is connected at both sipe end portions to the circumferential recess, and an inclination start line of the first curved sipe does not contact with the first curved sipe.

4. The pneumatic tire according to claim 1, wherein
   the plurality of sipes provided at intervals in the tire circumferential direction include a short sipe,
   a length in a tire width direction of the short sipe is shorter than a length in a tire width direction of the at least one of the curved sipes, and
   the short sipe is formed to overlap at least a part of at least one of the curved sipes in the tire circumferential direction, and is connected at a one-side sipe end portion to the main groove or the circumferential sipe.

5. The pneumatic tire according to claim 1, wherein
   the rib includes a plurality of thin ribs defined by the main groove and a circumferential sipe extending in the tire circumferential direction, and
   a length in a tire width direction of the chamfered inclined surface portion of each of the curved sipes is 40% or more of a length in a tire width direction of each of the thin ribs provided with at least one of the curved sipes.

6. The pneumatic tire according to claim 1, wherein a length in a tire width direction of the chamfered inclined surface portion of each of the curved sipes is 35 to 65% of a length in a tire width direction of at least one of the curved sipes.

* * * * *